United States Patent
Pang et al.

(10) Patent No.: US 7,287,892 B1
(45) Date of Patent: Oct. 30, 2007

(54) LIGHT SOURCE FOR BACK-LIT DISPLAYS

(75) Inventors: Siew It Pang, Bayan Lepas (MY); Tong Fatt Chew, Taman Sri Nibong (MY)

(73) Assignee: Avago Technologies ECBU IP (Singapore) Pte Ltd, Singapore (SG)

( * ) Notice: Subject to any disclaimer, the term of this patent is extended or adjusted under 35 U.S.C. 154(b) by 0 days.

(21) Appl. No.: 11/590,607

(22) Filed: Oct. 30, 2006

(51) Int. Cl.
*F21V 13/04* (2006.01)

(52) U.S. Cl. .................... 362/604; 362/560

(58) Field of Classification Search ........... 362/604, 362/560
See application file for complete search history.

(56) References Cited

U.S. PATENT DOCUMENTS

| | | | | |
|---|---|---|---|---|
| 3,497,686 A | * | 2/1970 | Young | 362/623 |
| 4,918,578 A | * | 4/1990 | Thompson | 362/634 |
| 5,027,258 A | * | 6/1991 | Schoniger et al. | 362/629 |
| 5,276,591 A | * | 1/1994 | Hegarty | 362/601 |
| 5,410,454 A | * | 4/1995 | Murase et al. | 362/611 |
| 6,144,536 A | * | 11/2000 | Zimmerman et al. | 361/31 |
| 6,285,420 B1 | * | 9/2001 | Mizumo et al. | 349/65 |
| 7,128,459 B2 | * | 10/2006 | Igarashi et al. | 362/621 |
| 7,237,939 B2 | * | 7/2007 | Kim et al. | 362/616 |

* cited by examiner

*Primary Examiner*—Hargobind S. Sawhney

(57) ABSTRACT

A light source having a light pipe and a light generation section. The light pipe includes a two-dimensional sheet of transparent material having a transparent top surface that is substantially parallel to a reflective bottom surface. The light pipe includes light pipe scattering centers that cause light traveling in the sheet of transparent material to be scattered in directions that allow some of the scattered light to escape the sheet through the top surface. The light generating section includes a plurality of LEDs and a mixing chamber. The LEDs are positioned to emit light into the mixing chamber. The mixing chamber includes an adapter having a wedge-shaped cavity with reflective walls. The cavity has an opening positioned to direct light into the light pipe. The mixing chamber includes scattering centers for redirecting light traveling in the cavity in directions that would not be obtained by reflection from the reflective walls.

7 Claims, 5 Drawing Sheets

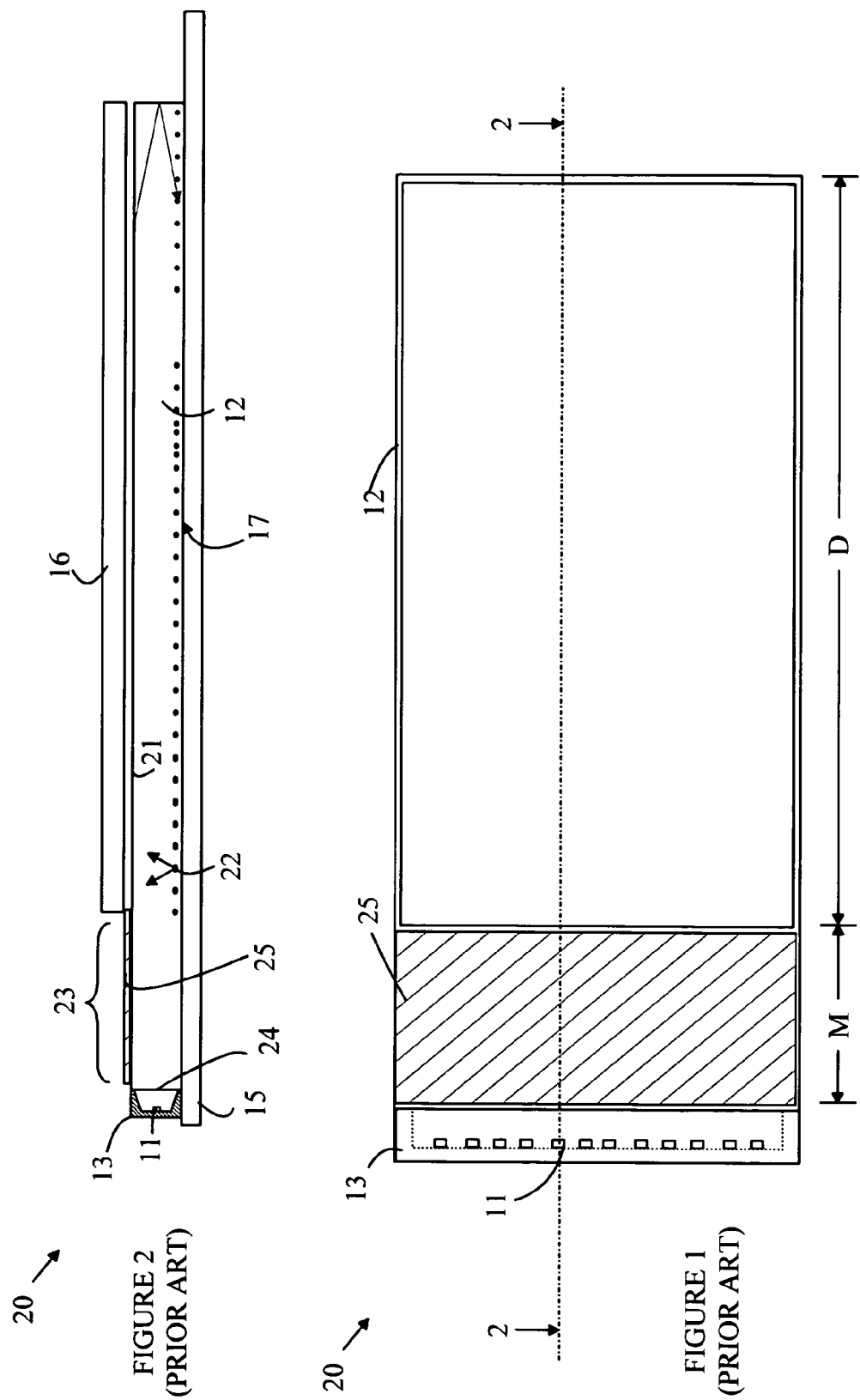

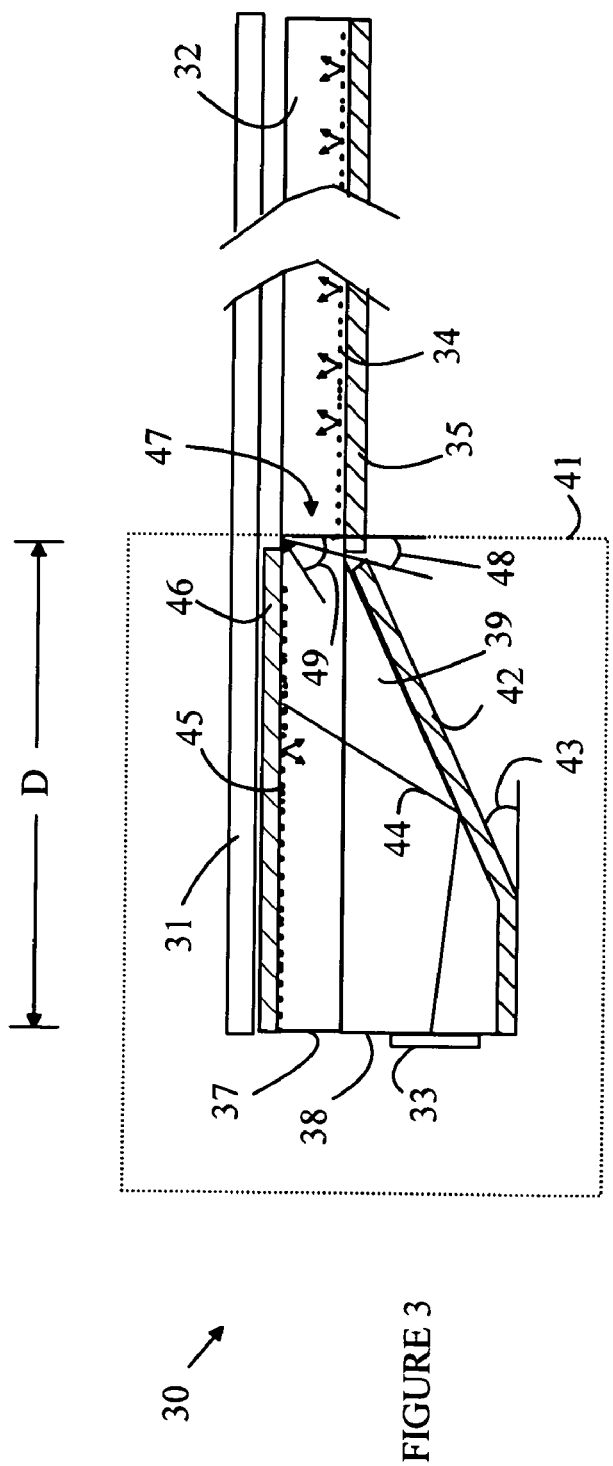
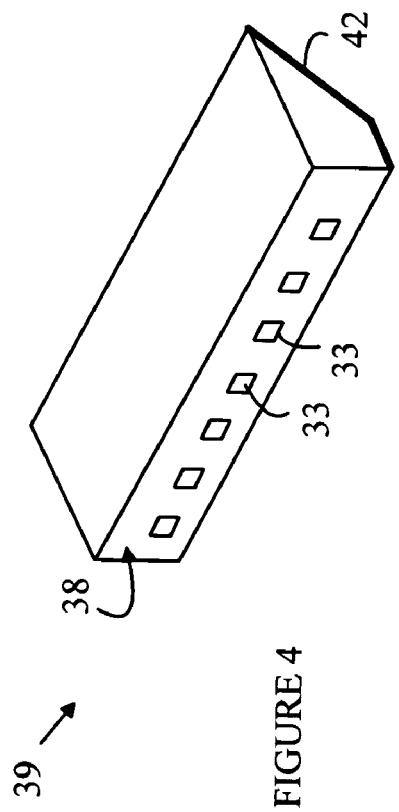
FIGURE 3
FIGURE 4

LIGHT SOURCE FOR BACK-LIT DISPLAYS

BACKGROUND OF THE INVENTION

Back-lit displays are used in a wide variety of computers and consumer devices such as TVs. For example, a back-lit liquid crystal display (LCD) is an array of pixels in which each pixel acts as a shutter that either passes or blocks light from a light source that is located behind the pixel. Color displays are implemented by equipping the pixels with color filters such that each pixel transmits or blocks light of a particular color. The intensity of the light from each pixel is set by the time the pixel is in the transmissive state.

The display is typically illuminated by a white light source that provides a uniform intensity of light across the back surface of the display. Illumination sources based on fluorescent lights are particularly attractive because of their high light output per watt-hour of power consumed. However, such sources require high driving voltages which makes them less attractive for battery operated devices. In addition, the thickness of the light source determines the minimum thickness of the display, and hence, light sources based on fluorescent tubes that are placed behind the LCD display are often too thick for many handheld device applications.

Thinner light sources can be constructed using a light guide consisting of a sheet of clear plastic that is illuminated at one or more edges by a light source. Light entering the sheet is internally reflected, and hence, trapped, until it is scattered by one of the scattering centers that are incorporated in the sheet. A portion of the scattered light then exits the sheet through the top surface of the sheet. If the scattering centers are properly placed in the sheet, the top surface provides a uniformly illuminated two-dimensional light source that can be used to illuminate a back-lit display.

Light guides such as those discussed above are also used to illuminate keypads in handheld devices. The keys can be implemented with a transparency that indicates the key positions or the keys can be implemented with thin film buttons that are mounted on the illuminated surface such that the areas between the keys are illuminated when the keypad is active. Such keypads are utilized in devices such as cellular telephones.

In LED-based displays, the light guides are illuminated by LEDs that are placed on one or more edges of the light guide. To provide a light source for a color LCD display, LEDs that emit light at three different wavelengths are used. Since the LEDs are point sources that emit light in relatively narrow spectral bands, a light mixing zone must be provided at the edge of the light guide and separated from the region to illuminate the display by a distance sufficient to assure that the light trapped under the region to be illuminated is uniform in intensity and color.

There is a trend in handheld devices toward ever-thinner configurations. Since the thickness of the light guide represents a significant portion of the thickness of many devices, the thickness of the light pipes has been reduced to the point that it is difficult to provide good coupling between the LEDs and the edge of the light guide. Light guides with a thickness of 0.4 mm are utilized in some display devices and a need for still thinner light guides exists. The thickness of the light guide is now approaching the size of the smallest LED packages, and hence, it is difficult to provide efficient coupling and mixing of the light from a number of LEDs into the edge of the light pipe.

SUMMARY OF THE INVENTION

The present invention includes a light source having a light pipe and a light generation section. The light pipe includes a two-dimensional sheet of transparent material having a transparent top surface that is substantially parallel to a reflective bottom surface. The light pipe includes light pipe scattering centers that cause light traveling in the sheet of transparent material to be scattered in directions that allow some of the scattered light to escape the sheet of transparent material through the top surface. The light generating section includes a plurality of LEDs and a mixing chamber. The LEDs are positioned to emit light into the mixing chamber. The mixing chamber includes an adapter having a wedge-shaped cavity with reflective walls. The cavity has an opening positioned to direct light into the light pipe. The mixing chamber includes mixing chamber scattering centers for redirecting light traveling in the cavity in directions that would not be obtained by reflection from the reflective walls. A portion of the light in the cavity is directed into the light pipe at angles at which that light will be reflected from the top and bottom surfaces of the sheet of transparent material back into the sheet of transparent material.

BRIEF DESCRIPTION OF THE DRAWINGS

FIG. 1 is a prior art top view of light source 20.

FIG. 2 is a cross-sectional view of light source 20 through line 2-2 shown in FIG. 1

FIG. 3 is a cross-sectional view of a back-lit display according to one embodiment of the present invention.

FIG. 4 is a perspective view of an embodiment of an adapter.

DETAILED DESCRIPTION OF EMBODIMENTS OF THE INVENTION

Figure 5:
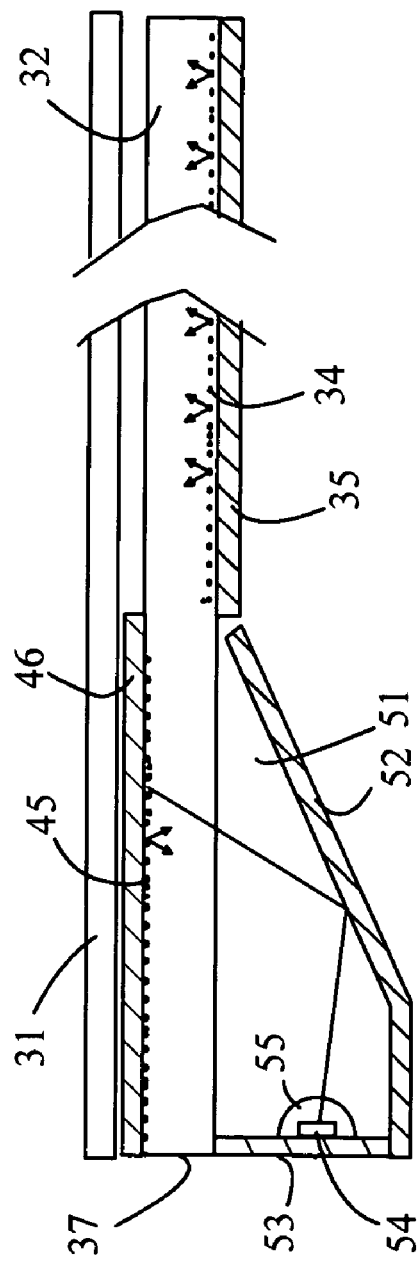
FIG. 5 is a cross-sectional view of another embodiment of a back-lit display utilizing a light source according to the present invention.

The manner in which the present invention provides its advantages can be more easily understood with reference to FIGS. 1 and 2, which illustrate a prior art light box arrangement for illuminating an LCD display 16. FIG. 1 is a top view of light source 20 and FIG. 2 is a cross-sectional view of light source 20 through line 2-2 shown in FIG. 1. Light source 20 utilizes an array of LEDs 11 to illuminate a light pipe 12. The LEDs are mounted on a carrier 13 that is mounted on a circuit board 15 that provides power to the LEDs. The LEDs are positioned such that light leaving the top of each LED illuminates the end 24 of light pipe 12. The light entering light pipe 12 at an angle less than the critical angle with respect to surface 21 is reflected back and forth within light pipe 12 until the light is either absorbed or scattered by particles 22 on surface 17. The scattered light that strikes surface 21 at angles greater than the critical angle escapes from the light pipe and illuminates the back surface of LCD display.

Ideally, the LEDs are arranged to duplicate a linear light source that is parallel to end 24 of light pipe 12. However, the LEDs are point light sources that have a significant distance between the individual LEDs, since a light source that has tightly packed LEDs would have too many LEDs for the light levels that are typically needed. In addition, any given LED emits light in a relatively narrow spectral band, and hence, LEDs that emit different colors must be present. The LEDs are typically arranged such that each LED is adjacent to two other LEDs that have different colors. For example, light sources having red, green, and blue LEDs typically repeat a pattern of red, blue, green LEDs along the array of LEDs. Hence, at a location immediately in front of the LEDs, the light source is not a good approximation of a linear source having a uniform output spectrum. To overcome this problem, a mixing zone 23 is provided in front of the LEDs. The mixing zone is typically covered with a reflective coating 25. The size of the mixing zone is chosen such that the light exiting the mixing zone is uniform in color spectrum and intensity.

As the thickness of light pipe 12 is reduced, a point is reached at which the height of carrier 13 is larger than the thickness of light pipe 12. At this point, the efficiency of the coupling of the light into light pipe 12 is significantly reduced.

In addition, thin displays also tend to be associated with small displays. That is, the distance D is reduced. However, the distance, M, required for the mixing zone does not decrease, and hence, the proportionately larger area must be reserved for the mixing zone. The mixing area is particularly problematic in devices in which D must be close to the total length of the display.

The present invention provides a mechanism for inserting light into the light pipe and providing improved mixing even in cases in which the light pipe has a thickness that is too small to allow direct coupling of the LED to the edge of the light pipe. Refer now to FIG. 3, which is a cross-sectional view of a back-lit display according to one embodiment of the present invention. Display 30 utilizes a light source according to the present invention that has a light pipe 32 to illuminate the back-lit element 31 in a manner analogous to that discussed above. The light that enters the light pipe is generated by one or more LEDs 33 that are mounted on one side of an adapter 39 that together with the portion of light pipe 32 covered by reflector 46 forms a mixing chamber 41. For the purposes of this example, it will be assumed that adapter 39 is made from a material having the same index of refraction as light pipe 32.

The portion of light pipe 32 that is adjacent to adapter 39 includes scattering centers 45 and a reflector 46. In this embodiment, surfaces 37 and 38 are also assumed to be reflecting. Surface 42 is also reflecting. Hence, light emitted by the LEDs into the mixing chamber is trapped in mixing chamber 41 until the light is absorbed or until the light leaves through aperture 47.

The goal of mixing chamber 41 is to collect as much of the light as possible from the LEDs and direct that light into aperture 47 at angles 49 that are greater than the critical angle 48. This light will then be trapped by internal reflection in light pipe 32 until it is scattered out of light pipe 32 by scattering centers 34 and/or reflector 35. Consider light ray 44. This light is reflected from reflector 42 and strikes the top surface of light pipe 32 in the region having the scattering centers. Some of this light will be scattered at angles that direct that light into aperture 47 and some of the scattered light will be directed back into adapter 39. The light reflected back into adapter 39 will be redirected back to the surface of light pipe 32 having the scattering centers, and hence, will have another chance to be directed into aperture 47. Light that is not scattered by the scattering centers is redirected back into adapter 39 by a reflective surface 46 in this embodiment. Hence, light that is not directed into aperture 47 will be recycled until it is either absorbed or enters aperture 47.

It should be noted that in the absence of scattering centers 45, or some other mechanism to randomize the direction of light within mixing chamber 41, the residence time of the light in mixing chamber 41 would be much longer. For example, at each pair of reflections from surfaces 42 and 46, the angle of the light rays with respect to the normal to the surface of light pipe 32 increases by an amount related to angle 43. After a few pairs of reflections, the light will be directed back toward surfaces 37 and 38, and hence, will require a number of further reflections before that light can again approach aperture 47.

It should also be noted that mixing chamber 41 provides light mixing in addition to the light redirection function discussed above. In the absence of the scattering centers, the path followed by the light when leaving the LEDs and entering aperture 47 is much larger than the distance, D, shown in FIG. 3. Since the mixing is a function of the path length, even in the absence of the scattering centers, the present invention can provide improved mixing for any given distance D. The scattering centers also enhance the light mixing.

In the above-described embodiments, adapter 39 was constructed from a material that has an index of refraction that is the same, or nearly the same, as light pipe 32. The index of refraction of the light pipe is typically between 1.35 and 1.75. Adapters with indices of refraction in this range also function adequately. In this case, the adapter can be molded from the same plastic as light pipe 32 and then attached to the bottom surface of light pipe 32 utilizing a clear cement having a similar index of refraction. Refer now to FIG. 4, which is a perspective view of an embodiment of an adapter that is constructed in this manner. The LEDs 33 are affixed to the outer surface of the molding using an appropriate index matching cement. Reflector 42 includes a reflecting layer that is deposited on the outside surfaces of adapter 39. To simplify the drawing, the reflecting surface on surface 38 has been omitted. However, it is to be understood that the area of surface 38 that is not covered by LEDs is also reflective.

In the above-described embodiments, scattering centers 45 are located on the top surface of light pipe 32 in the mixing region. The scattering centers provide a mechanism for redirecting light striking the surface to angles other than those that would be obtained by reflection from a mirror surface such as reflector 46. Hence, light that would miss aperture 47 is recycled and given another chance to reach aperture 47. This recycling function can be provided by placing scattering centers at other locations within mixing chamber 41. For example, reflector 42 could be replaced by a flat white surface that provides the desired scattering without absorbing a significant fraction of the light. Similarly, the other surfaces of mixing chamber 41 could be modified to include scattering centers as well, or in place of, the scattering centers shown at 45.

The scattering centers can be provided utilizing a number of different techniques. In embodiments in which the scattering centers are on a surface of the light pipe or of a solid mixing chamber such as that described above, the scattering centers can be created by roughening the surface in question.

The roughening should provide protrusions and/or pits in the surface. The protrusions and pits should have dimensions that are greater than the longest wavelength of light generated by the LEDs. In embodiments in which the light pipe and mixing chamber are constructed from a clear plastic, the surfaces in question can be roughened using mechanical techniques based on abrasives. In addition, the surfaces can be roughened using chemical etching after providing an appropriate lithographic mask on the surface. The scattering centers can also be provided in a separate layer of material by suspending scattering particles such as particles of $TiO_2$ in a clear epoxy having an index of refraction that is similar to that of the light pipe and then applying that epoxy to the surface in question. Similarly, a white paint can be applied to the surface in question, provided the paint does not absorb a significant fraction of the light.

In the above-described embodiments, the adapter was constructed from a plastic or similar polymer. However, the adapter can be constructed from any clear material that has an index of refraction similar to that of light pipe 32. For example, the adapter could be constructed from glass. In high power applications in which the temperature of the LEDs is relatively high, a glass adapter is more resistant to heat damage than a plastic mixing chamber.

While the above-described embodiments have utilized an adapter for coupling the LEDs to the light pipe, embodiments in which the adapter is hollow can also be constructed. Refer now to FIG. 5, which is a cross-sectional view of another embodiment of a back-lit display utilizing a light source according to the present invention. To simplify the discussion, those elements of display 50 that serve function analogous to elements of display 30 discussed above have been given the same numerical designations and will not be discussed in detail here. Display 50 utilizes a hollow adapter 51 having reflective walls 52 and 53. The LEDs are mounted on wall 53 as shown at 54.

Since light pipe 32 has an index of refraction that is significantly greater than that of the air in adapter 51, no light traveling at angles greater than the critical angle will be trapped in light pipe 32 unless light entering light pipe 32 from adapter 51 is redirected by scattering centers 45 such that the light travels in a direction different from the direction that would have been provided by a reflection from the reflector 46. Accordingly, the scattering centers must be on at least one surface of light pipe 32 in the region adjacent to adapter 51. The scattering centers are preferably located on the upper surface of light pipe 32 as shown in FIG. 5.

Wall 53 of the mixing chamber could be constructed from a printed circuit board (PCB) having a metal core for transferring heat from the LEDs to walls 52 and 53 to provide an extended surface area to improve the heat dissipation from the LEDs. The LED dies can be mounted directly on the PCB or packaged with reflectors and/or lens to optimize the light extraction from the dies. In the latter case, the packaged LEDs would be mounted on the PCB or the lenses could be incorporated into the PCB after the dies have been attached. For example, a spherical coating 55 can be applied over each die by depositing a droplet of silicone rubber over the die after the die has been attached to the PCB. The coating improves the extraction of light from the LED by reducing the amount of light that is trapped in the LED due to the difference in index of refraction between the LED and the air in the mixing chamber.

Figure 6:
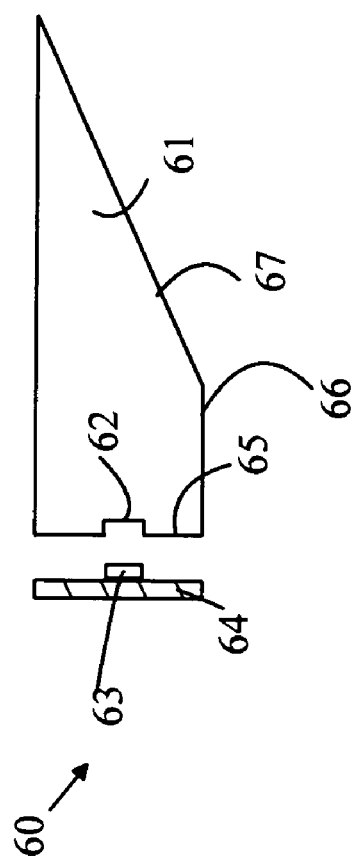
FIG. 6 is an exploded, cross-sectional view of a portion of an adapter according to one embodiment of the present invention.

In the case of a solid adapter, the adapter can be molded to provide recesses into which the LEDs are inserted. Refer to FIG. 6, which is an exploded, cross-sectional view of a portion of an adapter 60 according to one embodiment of the present invention. Adapter 60 includes a molded plastic structure 61 having recesses 62 molded into one side thereof. The recesses are located and sized to accept LEDs 63 when a PCB 64 having the LEDs is attached to surface 65. An index matching cement can be used to fill any voids in the recesses. Hence, the LEDs are effectively molded into the final mixing chamber while providing a heat-conducting surface to remove heat from the LEDs. The remaining reflective coatings on surfaces 66 and 67 can be applied after PCB 64 is bonded to structure 61.

Figure 7:
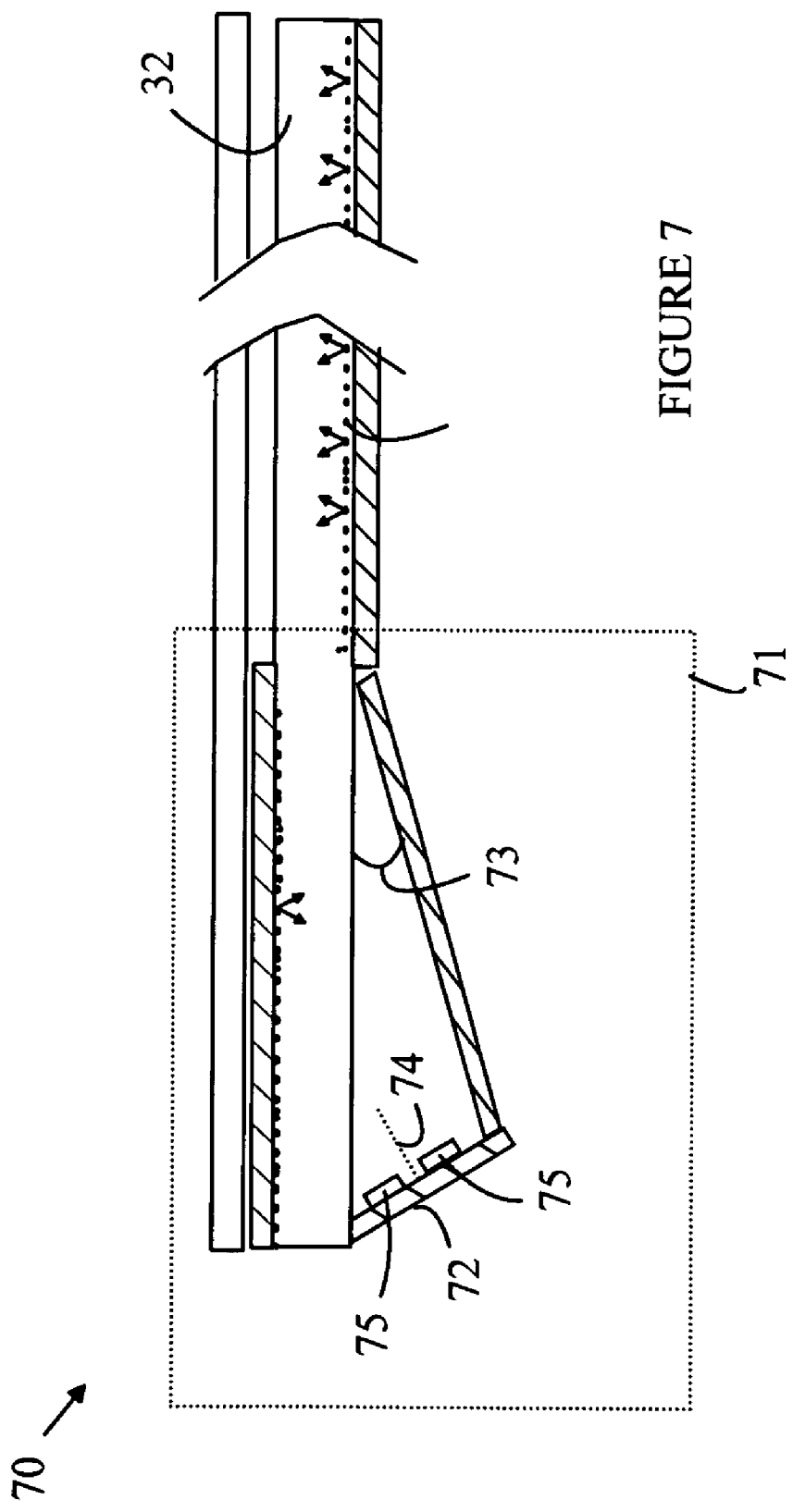
FIG. 7 is a cross-sectional view of a back-lit display that utilizes a light source according to another embodiment of the present invention.

The above-described embodiments utilize a mixing chamber in which the normal to the surface of the LEDs is parallel to the surface of the light pipe. However, other arrangements can be utilized. Refer to now to FIG. 7, which is a cross-sectional view of a back-lit display that utilizes a light source according to another embodiment of the present invention. Display 70 utilizes a mixing chamber 71 in which the LEDs 75 are mounted on a surface 72 having a normal 74 that intersects the bottom surface of light pipe 32 at an angle greater than 0. In one embodiment, the angle is chosen to be one half angle 73 to minimize the number of reflections to which the light emitted by LEDs 75 is subjected before entering the light pipe 32 in the absence of any scattering. It should also be noted that this arrangement reduces the thickness of the display in the mixing chamber region. Finally, it should be noted that display 70 utilizes a two dimensional array of LEDs as opposed to the single line of LEDs in the previously described embodiments.

Figure 8:
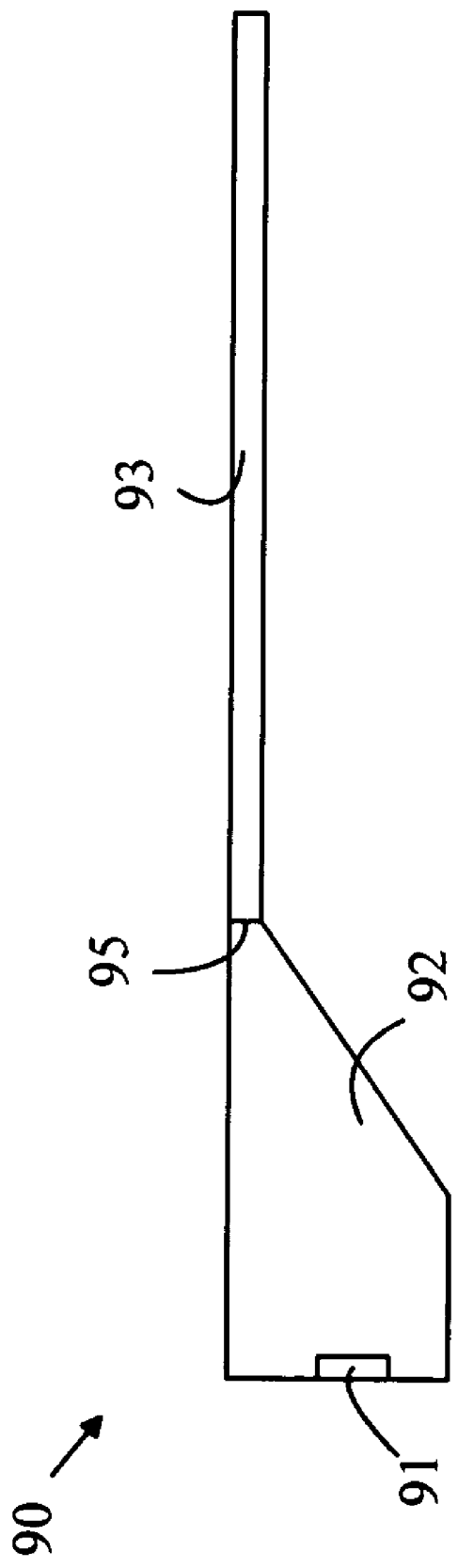
FIG. 8 is a cross-sectional view of a light source 90 according to another embodiment of the present invention.

The above-described embodiments of the present invention utilize a mixing chamber that includes part of the light pipe and an adapter. However, embodiments in which the mixing chamber is separate from the light pipe can also be constructed. Refer now to FIG. 8, which is a cross-sectional view of a light source 90 according to another embodiment of the present invention. Light source 90 utilizes a mixing chamber 92 to illuminate a light pipe 93. Light pipe 93 is constructed in a manner analogous to light pipe 32 described above. Mixing chamber 92 is a solid structure having an index of refraction similar to that of light pipe 93. The LEDs shown at 91 are positioned such that the light generated by the LEDs is injected into mixing chamber 92. The walls of mixing chamber 92, with the exception of the wall at aperture 95, are reflective. Mixing chamber 92 also includes scattering centers that provide the redirection of the light from the LEDs. The scattering centers can be provided by a coating on the walls or by the inclusion of scattering particles within the medium from which mixing chamber 92 is constructed. Mixing chamber 92 is bonded to light pipe 93 by an index matching cement.

Various modifications to the present invention will become apparent to those skilled in the art from the foregoing description and accompanying drawings. Accordingly, the present invention is to be limited solely by the scope of the following claims.

What is claimed is:

1. A light source comprising:

a light pipe comprising a two-dimensional sheet of transparent material having a transparent top surface that is substantially parallel to a reflective bottom surface, said light pipe comprising light pipe scattering centers that cause light traveling in said sheet of transparent material to be scattered in directions that allow some of said scattered light to escape said sheet of transparent material through said top surface, wherein a mixing chamber comprises a portion of said sheet of transparent material; and a light generating section comprising a plurality of LEDs and said mixing chamber, said LEDs being positioned to emit light into said mixing chamber, said mixing chamber comprising an adapter comprising a wedge-shaped cavity having reflective walls, said cavity having an opening positioned to direct light into said light pipe and mixing chamber scattering centers for redirecting light traveling in said cavity in directions that would not be obtained by reflection from said reflective walls, wherein a portion of said light directed into said light pipe enters said light pipe at angles at which that light will be reflected from said top and bottom surfaces of said sheet of transparent material back into said sheet of transparent material; wherein said mixing chamber scattering centers comprising scattering centers in said portion of said sheet of transparent material.

2. The light source of claim 1 wherein said mixing chamber comprises a transparent material that has an index of refraction between 1.35 and 1.75.

3. The light source of claim 1 wherein said mixing chamber comprises a hollow cavity.

4. The light source of claim 1 wherein said opening comprises a plane that is parallel to said bottom surface of said sheet of transparent material.

5. The light source of claim 1 wherein one wall of said mixing chamber comprises a circuit carrier with said LEDs mounted thereon.

6. The light source of claim 5 wherein said circuit carrier comprises a metal core that conducts heat from said LEDs.

7. The light source of claim 1 wherein said LEDs are embedded in said mixing chamber.

* * * * *